US009533425B2

(12) United States Patent
Sago et al.

(10) Patent No.: US 9,533,425 B2
(45) Date of Patent: Jan. 3, 2017

(54) ROTARY CUTTER MECHANISM

(71) Applicant: BROTHER KOGYO KABUSHIKI KAISHA

(72) Inventors: Akira Sago, Seto (JP); Takashi Takeuchi, Komaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 439 days.

(21) Appl. No.: 13/625,099

(22) Filed: Sep. 24, 2012

(65) Prior Publication Data

US 2013/0118330 A1 May 16, 2013

(30) Foreign Application Priority Data

Nov. 11, 2011 (JP) ................................. 2011-247475

(51) Int. Cl.

| | |
|---|---|
| ***B23D 25/02*** | (2006.01) |
| ***B26D 5/08*** | (2006.01) |
| ***B26D 1/38*** | (2006.01) |
| ***B26D 7/08*** | (2006.01) |
| ***B31D 1/02*** | (2006.01) |
| *B26D 7/00* | (2006.01) |

(52) U.S. Cl.

CPC ................. *B26D 1/385* (2013.01); *B26D 7/08* (2013.01); *B31D 1/026* (2013.01); *B26D 2007/005* (2013.01); *Y10T 83/8796* (2015.04)

(58) Field of Classification Search

CPC ........... B26D 7/1818; B26D 7/18; B26D 1/38; B26D 1/385; B26D 7/08; B26D 2007/005; B31D 1/026; Y10T 83/8796

USPC .......... 83/116, 168, 596, 349; 400/207, 242, 400/613, 611, 593

See application file for complete search history.

(56) References Cited

U.S. PATENT DOCUMENTS 2,632,510 A * 3/1953 Doppleb ................ B26D 1/385 83/169
3,143,016 A * 8/1964 Obenshain ........................ 83/98
3,855,891 A * 12/1974 Young ............................ 83/582
4,224,851 A * 9/1980 Imai ............................... 83/117

(Continued)

FOREIGN PATENT DOCUMENTS

JP 1-110090 7/1989
JP 06339893 12/1994

(Continued)

OTHER PUBLICATIONS

Japanese Office Action issued in Application No. 2011-247475 on Sep. 15, 2015.

*Primary Examiner* — Ghassem Alie
*Assistant Examiner* — Bharat C Patel
(74) *Attorney, Agent, or Firm* — McCarter & English, LLP

(57) ABSTRACT

A rotary cutter mechanism includes a rotary blade which is rotatably provided around a shaft center and which includes a first cutting edge portion, a counter blade which is provided to face a locus drawn by the first cutting edge portion of the rotating rotary blade and which includes a second cutting edge portion, and a protruding member which is provided on the edge portion of the rotary blade on the first direction side and which protrudes from the rotary blade toward a rotation direction side, the rotation direction side being a side on which the rotary blade faces the object to be cut in a case where the object to be cut is cut between the first cutting edge portion and the second cutting edge portion.

6 Claims, 16 Drawing Sheets

(56) References Cited

U.S. PATENT DOCUMENTS

| | | | | |
|---|---|---|---|---|
| 4,662,970 | A * | 5/1987 | Bancroft | 156/256 |
| 4,664,006 | A * | 5/1987 | Mitchell | 83/341 |
| 4,667,554 | A * | 5/1987 | Peery | B26D 1/385 83/583 |
| 5,000,069 | A * | 3/1991 | Knobel | 83/285 |
| 5,161,442 | A * | 11/1992 | Rilitz et al. | 83/117 |
| 5,174,795 | A * | 12/1992 | Wiand | B24B 7/22 451/530 |
| 5,199,341 | A * | 4/1993 | Jones | B26D 1/385 83/100 |
| 5,377,572 | A * | 1/1995 | Sonobe | B26D 1/0006 83/583 |
| 5,609,084 | A * | 3/1997 | Gronbjerg | 83/100 |
| 5,735,185 | A * | 4/1998 | Kondo | B26D 1/0006 83/611 |
| 5,764,060 | A * | 6/1998 | Gonzalez | A61F 9/08 116/205 |
| 6,058,817 | A * | 5/2000 | Kobayashi et al. | 83/24 |
| 6,772,663 | B2 * | 8/2004 | Machamer | 83/37 |
| 7,017,463 | B1 * | 3/2006 | Simpson | 83/117 |
| 7,077,185 | B2 * | 7/2006 | Steinberger | 156/527 |
| 7,673,863 | B2 * | 3/2010 | Iguchi | B65H 39/10 270/32 |
| 7,798,039 | B2 * | 9/2010 | Schurch et al. | 83/13 |
| 8,166,858 | B2 * | 5/2012 | Luquette | 83/115 |
| 8,701,533 | B2 * | 4/2014 | Nihashi et al. | 83/349 |
| 2007/0125474 | A1 * | 6/2007 | Barker et al. | 156/71 |
| 2008/0135179 | A1 * | 6/2008 | Bedard | 156/510 |
| 2009/0110461 | A1 * | 4/2009 | Inaba et al. | 400/593 |

FOREIGN PATENT DOCUMENTS

| | | |
|---|---|---|
| JP | 2003182930 A | 7/2003 |
| JP | 2005205581 | 8/2005 |

* cited by examiner

ROTARY CUTTER MECHANISM

CROSS-REFERENCE TO RELATED APPLICATION

This application claims priority to Japanese Patent Application No. 2011-247475, filed Nov. 11, 2011, the content of which is hereby incorporated herein by reference in its entirety.

BACKGROUND

The present disclosure relates to a rotary cutter mechanism that cuts an object to be cut.

A rotary cutter mechanism is known that can cut an object to be cut that is transported. This type of rotary cutter mechanism is provided, for example, on a sheet attachment device in order to cut an adhesive tape. In the sheet attachment device, a roller is provided separately from a rotary cutter. In the sheet attachment device, the rotary cutter cuts the adhesive tape while the roller is pressing the adhesive tape against a paper tag.

SUMMARY

However, in a case where the above-described rotary cutter mechanism cuts the adhesive tape a plurality of times, there may be a case in which adhesive of the adhesive tape is deposited on a cutting edge of a rotary blade of the rotary cutter. In a case where the rotary cutter mechanism cuts the adhesive tape in this state, there may be a case in which an end portion of the cut adhesive tape adheres to the adhesive deposited on the cutting edge of the rotary blade of the rotary cutter. As a result, for example, there may be a case in which the cut adhesive tape rotates together with the rotary blade and the next cutting of the adhesive tape cannot be performed properly. As in the above-described sheet attachment device, in a case where the rotary cutter cuts the adhesive tape while the roller is pressing the adhesive tape against the paper tag, the adhesive tape is pulled by the roller. Therefore, the adhesive tape is unlikely to adhere to the rotary blade. However, since it is necessary to separately provide the roller, the device provided with the rotary cutter mechanism is increased in size.

Various embodiments of the broad principles derived herein provide a rotary cutter mechanism that can make it difficult for a cut object to adhere to a rotary blade while achieving a size reduction of a device.

Embodiments provide a rotary cutter mechanism that includes a rotary blade, a counter blade, and a protruding member. The rotary blade which is rotatably provided around a shaft center and which includes a first cutting edge portion, the first cutting edge portion having a width, in an axial line direction of the shaft center, at an edge portion on a first direction side. The first direction is a direction away from the shaft center. The counter blade which is provided to face a locus drawn by the first cutting edge portion of the rotating rotary blade and which includes a second cutting edge portion, the second cutting edge portion having a width in the axial line direction. The counter blade configured to cut an object to be cut between the first cutting edge portion and the second cutting edge portion of the rotating rotary blade. The protruding member which is provided on the edge portion of the rotary blade on the first direction side and which protrudes from the rotary blade toward a rotation direction side. The rotation direction side is a side on which the rotary blade faces the object to be cut in a case where the object to be cut is cut between the first cutting edge portion and the second cutting edge portion.

BRIEF DESCRIPTION OF THE DRAWINGS

Embodiments will be described below in detail with reference to the accompanying drawings in which.

DETAILED DESCRIPTION

Hereinafter, an embodiment of the present disclosure will be explained with reference to the drawings. The present embodiment is an embodiment in a case where a rotary cutter mechanism of the present disclosure is applied to a label generation device, which is a printer. In the explanation below, the upper side, the lower side, the lower left side, the upper right side, the upper left side and the lower right side of FIG. 1 are respectively defined as the upper side, the lower side, the front side, the rear side, the left side and the right side of a label generation device 500.

Figure 1:
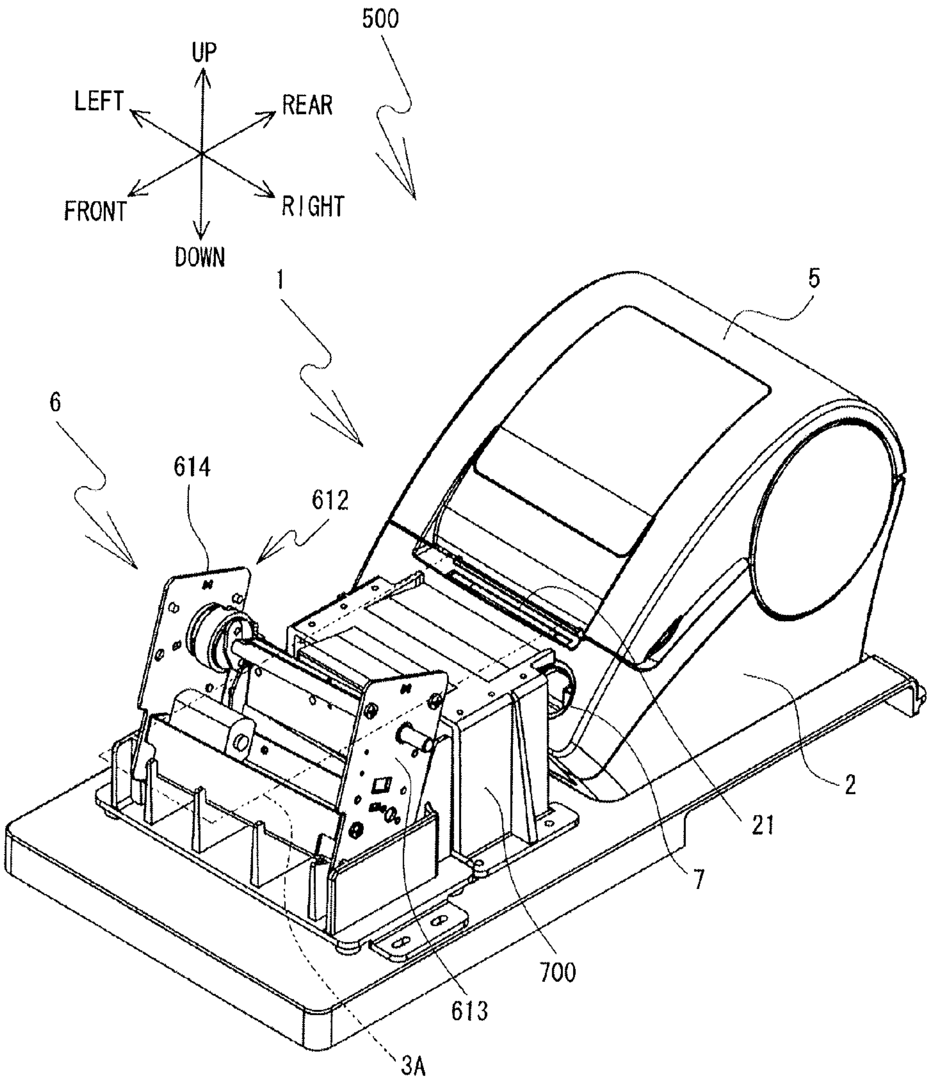
FIG. 1 is a perspective view showing a schematic structure of a label generation device that is provided with a rotary cutter mechanism according to an embodiment of the present disclosure.

As shown in FIG. 1, the label generation device 500 is provided with a label generation device main body 1 and a rotary cutter mechanism 6. A structure of the label generation device main body 1 will be explained with reference to FIG. 1, FIG. 2 and FIG. 3. The label generation device main body 1 is a device that can print various characters, numbers and graphics etc. on a long label tape 3A (refer to FIG. 3). As shown in FIG. 1, the label generation device main body

1 is long in the front-rear direction, and has a rectangular parallelepiped shape in which a top surface is rounded in an arc shape. The label generation device main body 1 includes a housing 2 and a cover 5. The housing 2 forms a main body of the label generation device main body 1. The cover 5 may cover a part of a top surface of the housing 2. A power source switch 7 and various input keys (not shown in the drawings) are provided on a top surface of a front end portion of the housing 2.

The cover 5 is provided to the rear of the power source switch 7. The cover 5 can be freely opened and closed, with the left-right direction of a rear end portion of the label generation device main body 1 serving as a point of support. A discharge opening 21 is provided between the power source switch 7 and the cover 5. The discharge opening 21 is formed by a front edge portion of the cover 5 and the housing 2, and extends in the left-right direction. The label tape 3A (refer to FIG. 3) after printing is discharged from the discharge opening 21.

Figure 3:
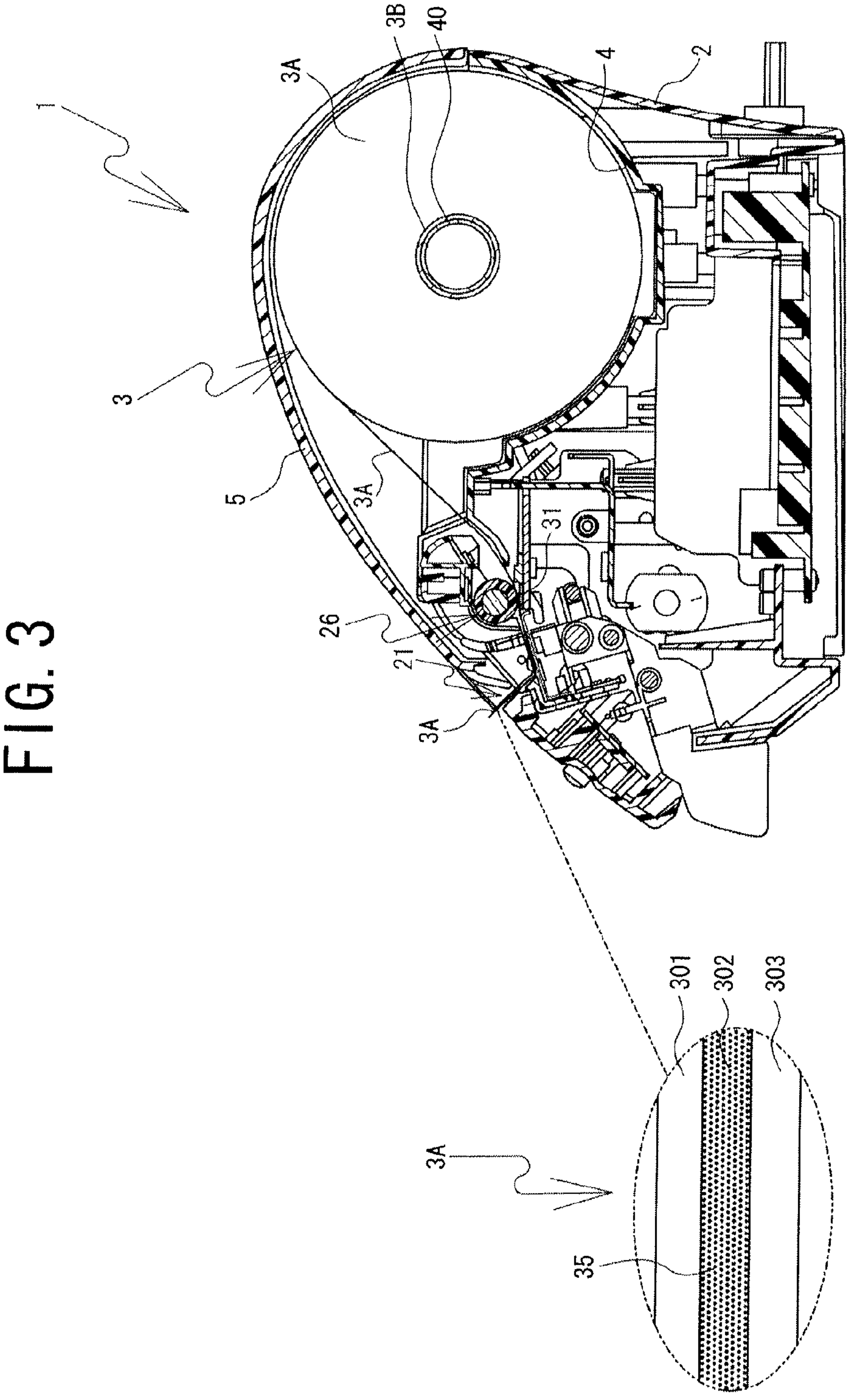
FIG. 3 is a cross-sectional view of a label generation device main body, as viewed from a right side.

As shown in FIG. 3, a tape holder storage portion 4 is provided in a rear inner portion of the label generation device main body 1, on the lower side of the cover 5. The tape holder storage portion 4 is downwardly recessed in an arc shape in a side view. A column-shaped tape holder 3 can be stored in the tape holder storage portion 4 such that an axial line of the tape holder 3 is directed in the left-right direction. The tape holder 3 is formed such that the label tape 3A with a predetermined width is wound in a roll shape around a column-shaped winding core 3B having a predetermined outer peripheral diameter. A substantially cylindrical shaped holder shaft member 40 is provided on the inner peripheral side of the winding core 3B. The holder shaft member 40 may rotatably support the tape holder 3. In a case where the cover 5 is opened, the tape holder 3 can be inserted to and removed from the tape holder storage portion 4.

In the present embodiment, the label tape 3A has a three-layer structure (refer to a partially enlarged view shown in FIG. 3). More specifically, the label tape 3A may be formed such that a release paper 301, a layer 302 of an adhesive 35 (hereinafter referred to as an "adhesive layer 302") and a long heat-sensitive paper 303 having a self color development property are laminated in that order, from the side (the upper side of the partially enlarged view shown in FIG. 3) of the label tape 3A that is wound on the outer side of the roll toward the opposite side (the lower side of the partially enlarged view shown in FIG. 3). The heat-sensitive paper 303 may be so-called thermal paper. In other words, the release paper 301 may be bonded to one of surfaces of the heat-sensitive paper 303, by the adhesive layer 302. In a case where a completed printed label 305 (refer to FIG. 4) is attached to a predetermined article or the like, the release paper 301 is released, and thus the printed label 305 can be bonded to the predetermined article or the like by the adhesive layer 302.

A thermal head 31 that performs desired printing is provided on the downstream side, in the transport direction, of a position at which the label tape 3A is pulled from the tape holder 3. A platen roller 26 that faces the thermal head 31 is provided above the thermal head 31. The platen roller 26 may pull out the label tape 3A wound around the winding core 3B, and transport the label tape 3A to a feed path that leads to the discharge opening 21.

A lever (not shown in the drawings) to move the platen roller 26 up and down is provided in the housing 2, in front of and to the left of the tape holder storage portion 4. In a case where the cover 5 is opened, the lever may turn upward due to an urging force of a coil spring (not shown in the drawings) and a roller holder moves upward. As a result of this, the platen roller 26 may be separated from the thermal head 31 and the label tape 3A. In this case, the label generation device main body 1 is brought into a state in which printing cannot be performed. The user can insert and remove the tape holder 3 in a state in which the cover 5 is opened.

In a case where the cover 5 is closed, the lever may be pressed downward by the cover 5, and the roller holder moves downward. As a result of this, the platen roller 26 may press the label tape 3A against the thermal head 31 (refer to FIG. 3). In this case, the label generation device main body 1 is brought into a state in which printing can be performed. The thermal head 31 may be driven and controlled in this state, and thus the label tape 3A may be transported. The platen roller 26 may be rotatably driven by a pulse motor and thus the thermal head 31 may be driven and controlled. The platen roller 26 may be driven by a stepping motor or the like. While the label tape 3A is being transported, desired printing may be performed by the thermal head 31 with respect to a printing area (not shown in the drawings) provided on the label tape 3A. The printed label tape 3A may be discharged from the discharge opening 21. The discharged label tape 3A may be cut to a desired length by the rotary cutter mechanism 6, which will be described later, and the printed label 305 (refer to FIG. 4) may be generated. Dotted lines in FIG. 1 and FIG. 5 indicate the feed path of the label tape 3A that to be transported.

As shown in FIG. 1, a guide placement stand 700 is provided to the front (on the downstream side, in the transport direction, of the discharge opening 21) of the label generation device main body 1. The rotary cutter mechanism 6 is placed further on the downstream side, in the transport direction, of the guide placement stand 700. The guide placement stand 700 may guide the printed label tape 3A discharged from the discharge opening 21 to between a rotary blade 621 (refer to FIG. 9) and a counter blade 631 (refer to FIG. 9). The rotary blade 621 and the counter blade 631 are provided on the rotary cutter mechanism 6. The rotary blade 621 and the counter blade 631 are configured to cut the label tape 3A.

Figure 4:
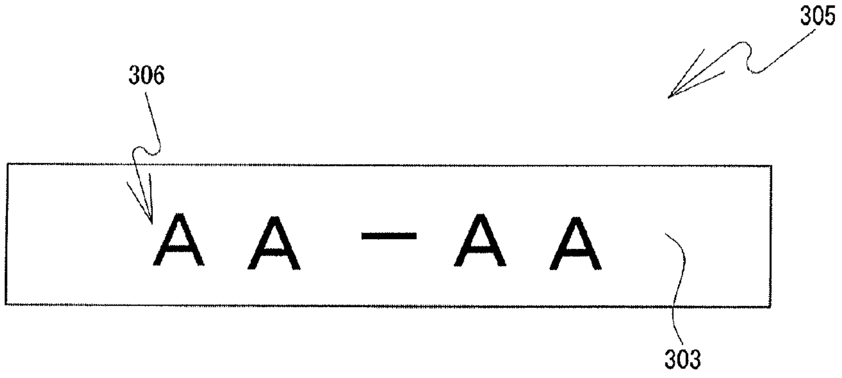
FIG. 4 is a plan view of a printed label.

FIG. 4 shows an example of the printed label 305 that may be generated by the rotary cutter mechanism 6 cutting the label tape 3A. The printed label 305 has a three-layer structure as shown in the partially enlarged view of the label tape 3A shown in FIG. 3. The heat-sensitive paper 303, the adhesive layer 302 and the release paper 301 may be laminated in that order, from the front surface side of the label tape 3A toward the opposite side. A print 306 (the characters "AA-AA" in the example shown in FIG. 4) may be printed on the surface of the heat-sensitive paper 303.

The rotary cutter mechanism 6 will be explained with reference to FIG. 5 to FIG. 10. As shown in FIG. 5 to FIG. 9, the rotary cutter mechanism 6 includes a housing 612, a rotating body 620 and a holding body 630. The rotary cutter mechanism 6 may cut the label tape 3A that has been printed by the thermal head 31. The label tape 3A may be cut linearly by the rotary blade 621 (which will be described later) and the counter blade 631 (which will be described later) working cooperatively.

The housing 612 includes a first wall portion 613, a second wall portion 614 and a connecting portion 611. The first wall portion 613 is a wall portion that forms the right end of the housing 612. In a right portion of the rotary cutter mechanism 6, the first wall portion 613 extends diagonally upward to the rear. The second wall portion 614 is a wall portion that forms the left end of the housing 612. In a left portion of the rotary cutter mechanism 6, the second wall portion 614 extends diagonally upward to the rear. The connecting portion 611 forms a connection between a lower portion of the first wall portion 613 and a lower portion of the second wall portion 614. The connecting portion 611 is a lower wall portion of the housing 612. Front and rear edge portions of the connecting portion 611 bend upward and extend slightly upward (refer to FIG. 7).

Figure 2:
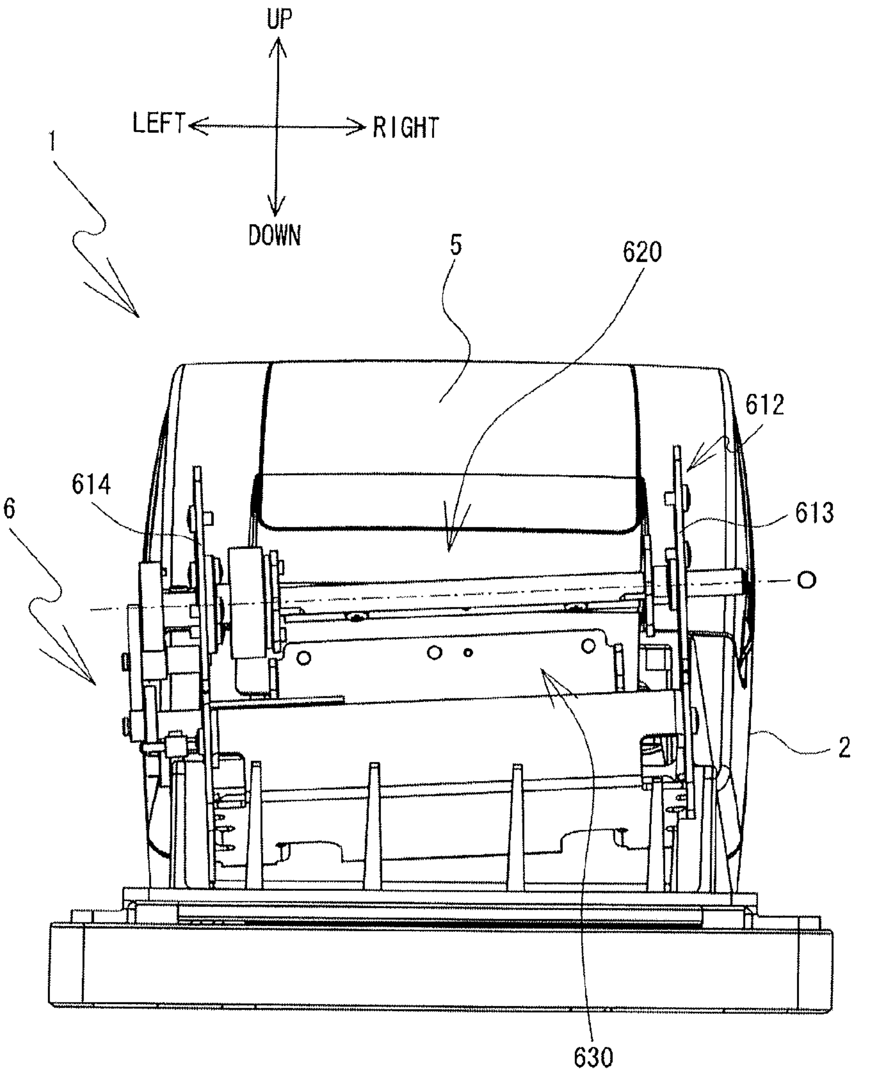
FIG. 2 is a front view of the label generation device shown in FIG. 1.

As shown in FIG. 2, the rotary cutter mechanism 6 is disposed in a posture in which the first wall portion 613 and the second wall portion 614 of the housing 612 are inclined slightly to the left with respect to the vertical direction. However, for explanatory convenience and in order to simplify the drawings, in FIG. 5 to FIG. 9, the rotary cutter mechanism 6 is shown in a state in which the first wall portion 613 and the second wall portion 614 of the housing 612 match in the vertical direction.

As shown in FIG. 5 to FIG. 9, the rotating body 620 is provided between the first wall portion 613 and the second wall portion 614. The rotating body 620 includes a counter blade lift cam 616, a first bracket 622 (refer to FIG. 5), a second bracket 623 (refer to FIG. 7), a rotary shaft 650 and a rotary blade mounting portion 624. The counter blade lift cam 616 is provided on the right side of the second wall portion 614. The counter blade lift cam 616 is provided around the rotary shaft 650, and rotates along with the rotation of the rotary shaft 650. The counter blade lift cam 616 has a column shape whose axis line is a shaft center O. A cut-out portion 618 is formed in a section of an outer peripheral side surface of the counter blade lift cam 616. The cut-out portion 618 is a portion formed by cutting out a section of the column such that the leading end of the counter blade lift cam 616 is tapered. The cut-out portion 618 is provided in the counter blade lift cam 616, in a section located on the right side of the rotary blade 621. In the outer peripheral side surface of the counter blade lift cam 616, a section other than the cut-out portion 618 is a pressing surface 617. The pressing surface 617 is a surface that may press a receiving portion 644 (which will be described later) of the counter blade 631 toward the rear. The first bracket 622 is provided on the right side of the second wall portion 614 (refer to FIG. 5). The second bracket 623 is provided on the left side of the first wall portion 613 (refer to FIG. 7). The rotary shaft 650 extends such that it connects the first bracket 622 and the second bracket 623, and is provided in the housing 612 such that the rotary shaft 650 can rotate around the shaft center O. The rotary blade mounting portion 624 is provided on the rotary shaft 650 and extends in the left-right direction. The rotary blade mounting portion 624 may support the rotary blade 621. The rotary blade 621 may rotate around the shaft center O along with the rotation of the rotary shaft 650.

The rotary blade 621 extends in a first direction and in the left-right direction, and has a plate shape that is long in the left-right direction. The first direction is a direction which is orthogonal to the left-right direction and which is away from the shaft center O (a direction toward the outside in the radial direction of the rotary shaft 650). The length of the rotary shaft 621 in the left-right direction is slightly shorter than the length of the rotary blade mounting portion 624 in the left-right direction. A first cutting edge portion 621A is provided on an edge portion of the rotary blade 621 on the first direction side (an edge portion on the outer peripheral side of the rotating rotary blade 621). The first cutting edge portion 621A has a width in an axial line direction of the shaft center O (in the present embodiment, a width in the left-right direction). In a case where the rotating body 620 rotates, the first cutting edge portion 621A draws a rotation locus 80 around the shaft center O (refer to FIG. 12). The direction of arrows 81 shown in FIG. 12 indicates a rotation direction of the rotary blade 621 (a direction in which the label tape 3A to be cut between the rotary blade 621 and the counter blade 631). The rotary blade 621 rotates in the rotation direction, and thus the first cutting edge portion 621A cuts the label tape 3A while the first cutting edge portion 621A is moving from the upper side to the lower side with respect to a second cutting edge portion 631A.

Figure 9:
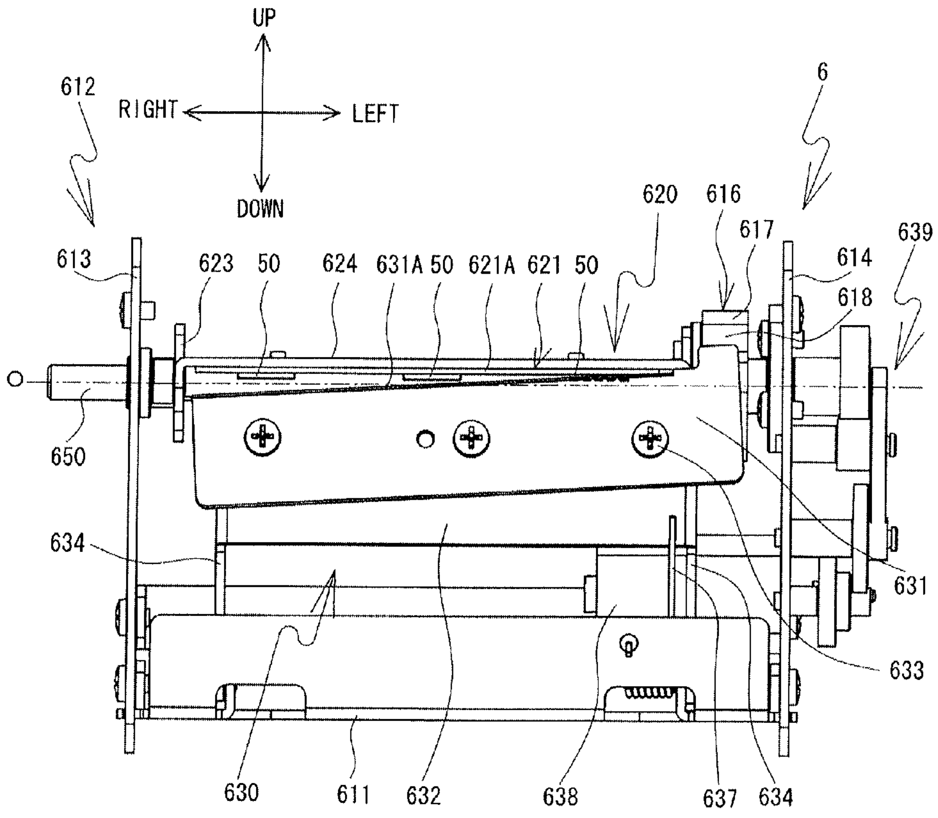
FIG. 9 is a rear view of the rotary cutter mechanism.
Figure 10:
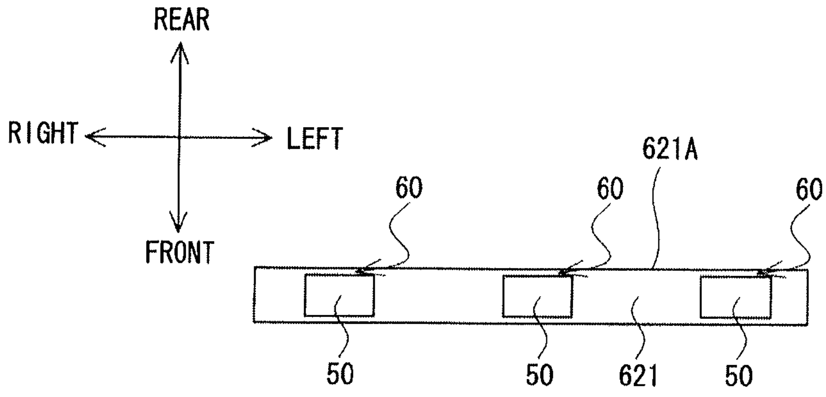
FIG. 10 is a view of a rotary blade shown in FIG. 9, as viewed from a rotation direction side.

As shown in FIG. 9 and FIG. 10, the rotary blade 621 includes protruding members 50. The protruding members 50 are members that protrude from the rotary blade 621 toward the rotation direction side of the rotary blade 621. The rotation direction side of the rotary blade 621 is a side of the rotary blade 621 that faces downward in a case where the first cutting edge portion 621A and the second cutting edge portion 631A are closest to each other (refer to FIG. 12 A). More specifically, the rotation direction side of the rotary blade 621 is a side of the rotary blade 621 that faces the label tape 3A in a case where the label tape 3A is cut between the first cutting edge portion 621A and the second cutting edge portion 631A (refer to FIG. 12 A). A plurality of the protruding members 50 are provided along a direction (the left-right direction in FIG. 10) in which the first cutting edge portion 621A extends. The protruding members 50 are provided somewhat closer to the shaft center O side (the lower side in FIG. 10) than the leading edge of the first cutting edge portion 621A on the first direction side (the upper side in FIG. 10). Each of the protruding members 50 is a sheet (a sheet made of synthetic resin, for example) having a certain thickness. The plurality of protruding members 50 are separated from each other and respectively provided on a left portion, a central portion and a right portion of the rotary blade 621 in the left-right direction. The protruding members 50 may be attached to a surface on the rotation direction side of the rotary blade 621 using a double-sided adhesive tape (not shown in the drawings). For example, the thickness of the protruding members 50 is 1 mm.

Figure 6:
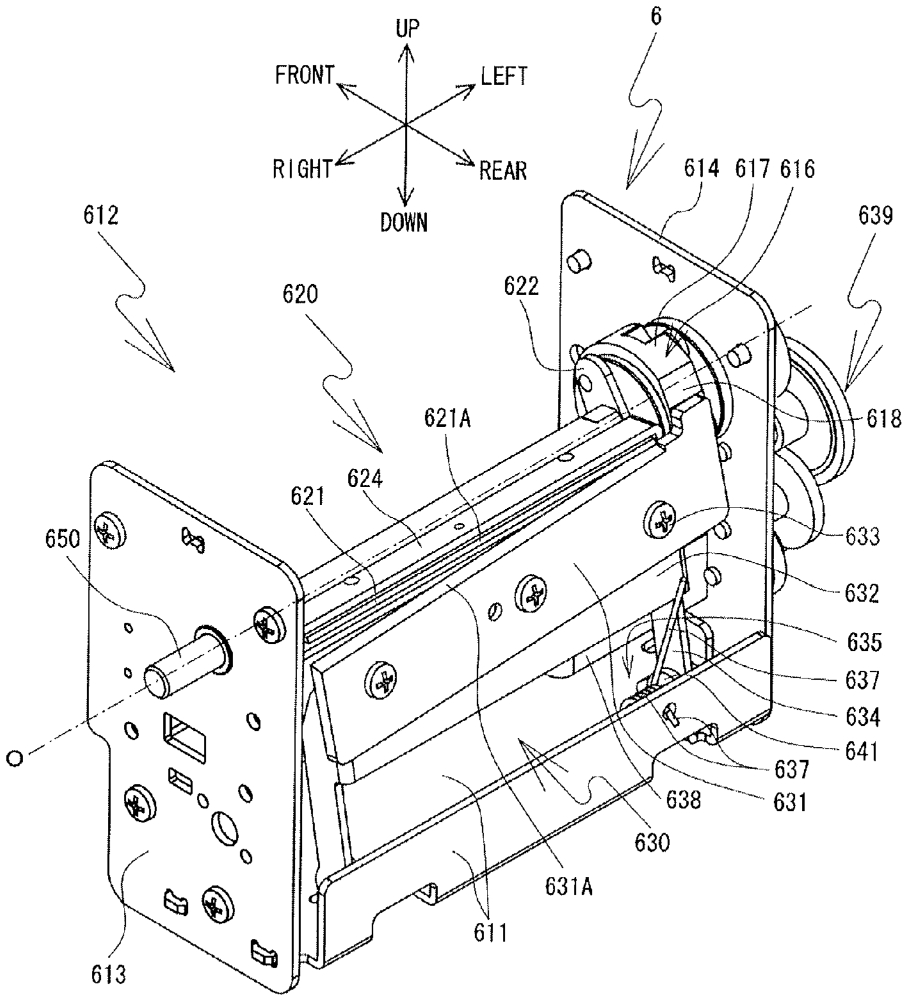
FIG. 6 is a perspective view of the rotary cutter mechanism, as viewed from another direction.
Figure 7:
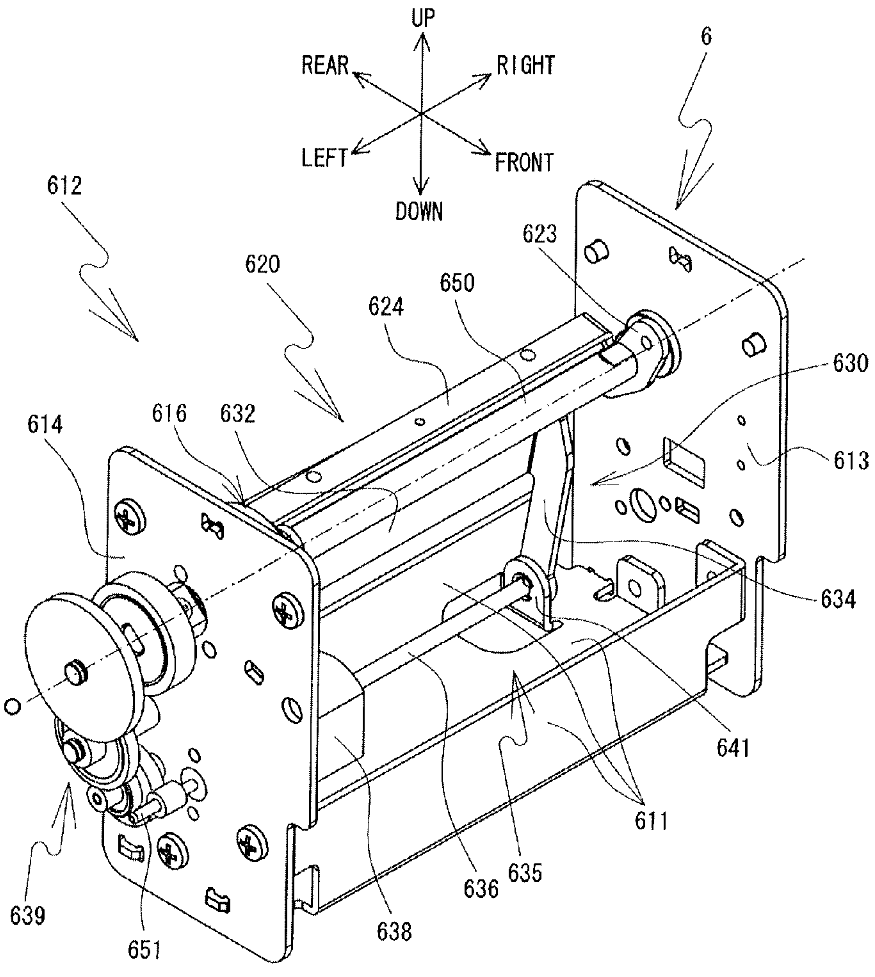
FIG. 7 is a perspective view of the rotary cutter mechanism, as viewed from yet another direction.
Figure 8:
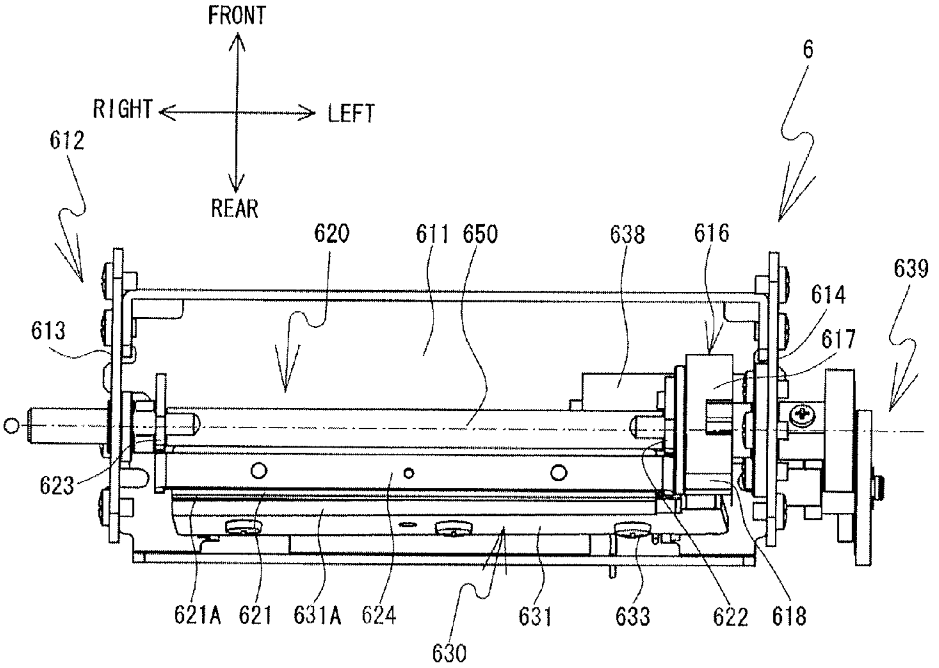
FIG. 8 is a plan view of the rotary cutter mechanism.

The holding body 630 includes a plate-shaped holding portion 632 as shown in FIG. 6, FIG. 8 and FIG. 9. The holding portion 632 includes the counter blade 631, which is a fixed blade. The holding portion 632 is also provided with extended portions 634 on left and right end portions. The holding portion 632 may be swingably supported, via the left and right extended portions 634, by a swing support mechanism 635 (refer to FIG. 7) with respect to the housing 612.

As shown in FIG. 6 and FIG. 7, the swing support mechanism 635 includes a pair of left and right hinge arms 641, a support shaft 636 and a coil spring 637. The pair of left and right hinge arms 641 are arranged in a standing condition and extend upward from the connecting portion 611. The connecting portion 611 is the lower wall portion of the housing 612. The support shaft 636 may be rotatably inserted into the pair of left and right hinge arms 641. The extended portions 634 are fixed to both the ends of the support shaft 636. The extended portions 634 are portions that extend downward from the left and right end portions of the holding portion 632. The coil spring 637 is wound around a left end portion of the support shaft 636 (refer to FIG. 6). One end (the rear end) of the coil spring 637 is fixed to a wall portion of a rear end portion of the connecting portion 611. The other end (the upper end) of the coil spring 637 abuts on a rear portion of the holding portion 632. The support shaft 636 may be swingably supported by the hinge arms 641, and thus the holding portion 632 can swing back and forth with respect to the housing 612. The support shaft 636 is fixed to the left and right extended portions 634. The coil spring 637 urges the holding portion 632 forward (in a direction toward the rotating body 620). As a result, the holding portion 632 can swing with respect to the housing 612 such that the holding portion 632 can come close to and move away from the rotation locus 80 (refer to FIG. 12) of the first cutting edge portion 621A. In a case where the label tape 3A is cut, before the first cutting edge portion 621A intersects with the second cutting edge portion 631A, the pressing surface 617 of the counter blade lift cam 616 comes into contact with the receiving portion 644 (which will be described later) of the counter blade 631 and presses the counter blade 631 in a direction to separate from the rotation locus 80. Thus, the second cutting edge portion 631A is slightly separated from the rotation locus 80. After that, in a case where the cut-out portion 618 of the counter blade lift cam 616 faces the receiving portion 644, the second edge portion 631A is moved to the rotation locus 80 side by an urging force of the coil spring 637. Then, while the second cutting edge portion 631A is being urged to the rotation locus 80 side, the label tape 3A may be cut by the first cutting edge portion 621A and the second cutting edge portion 631A.

As shown in FIG. 6 and FIG. 7, the counter blade 631 may be fixed to a rear surface of the holding portion 632 using screws 633. The counter blade 631 protrudes further upward than the upper edge of the holding portion 632. The counter blade 631 faces the rotation locus 80 (refer to FIG. 12 A to FIG. 12 C). The rotation locus 80 is the locus drawn by the first cutting edge portion 621A of the rotating rotary blade 621. The receiving portion 644 that protrudes upward is provided on an upper left portion of the counter blade 631. The receiving portion 644 is a portion that is pressed rearward by the pressing surface 617 of the counter blade lift cam 616. The second cutting edge portion 631A is provided on the right side of the receiving portion 644, on the upper end of the counter blade 631. The second cutting edge portion 631A has a width in the axial line direction of the shaft center O. The second cutting edge portion 631A configured to cut the label tape 3A between the second cutting edge portion 631A and the first cutting edge portion 621A of the rotating rotary blade 621. The direction in which the first cutting edge portion 621A extends (the left-right direction) is inclined with respect to the direction in which the second cutting edge portion 631A extends (the direction in which it extends slightly to the upper left). Therefore, in a case where the rotating rotary blade 621 approaches the counter blade 631, the first cutting edge portion 621A intersects with the second cutting edge portion 631A sequentially from one end (the left end) of the first cutting edge portion 621A toward the other end (the right end). In this state, in a case where the label tape 3A is introduced between the first cutting edge portion 621A and the second cutting edge portion 631A, the first cutting edge portion 621A and the second cutting edge portion 631A may start cutting the label tape 3A from a left end portion of the label tape 3A. The first cutting edge portion 621A and the second cutting edge portion 631A can proceed to cut the label tape 3A linearly, gradually toward the right side. The direction in which the first cutting edge portion 621A extends is inclined with respect to the direction in which the second cutting edge portion 631A extends. Therefore, in a case where the first cutting edge portion 621A and the second cutting edge portion 631A cut the label tape 3A, the label tape 3A may be cut while a so-called shear angle is formed.

Figure 5:
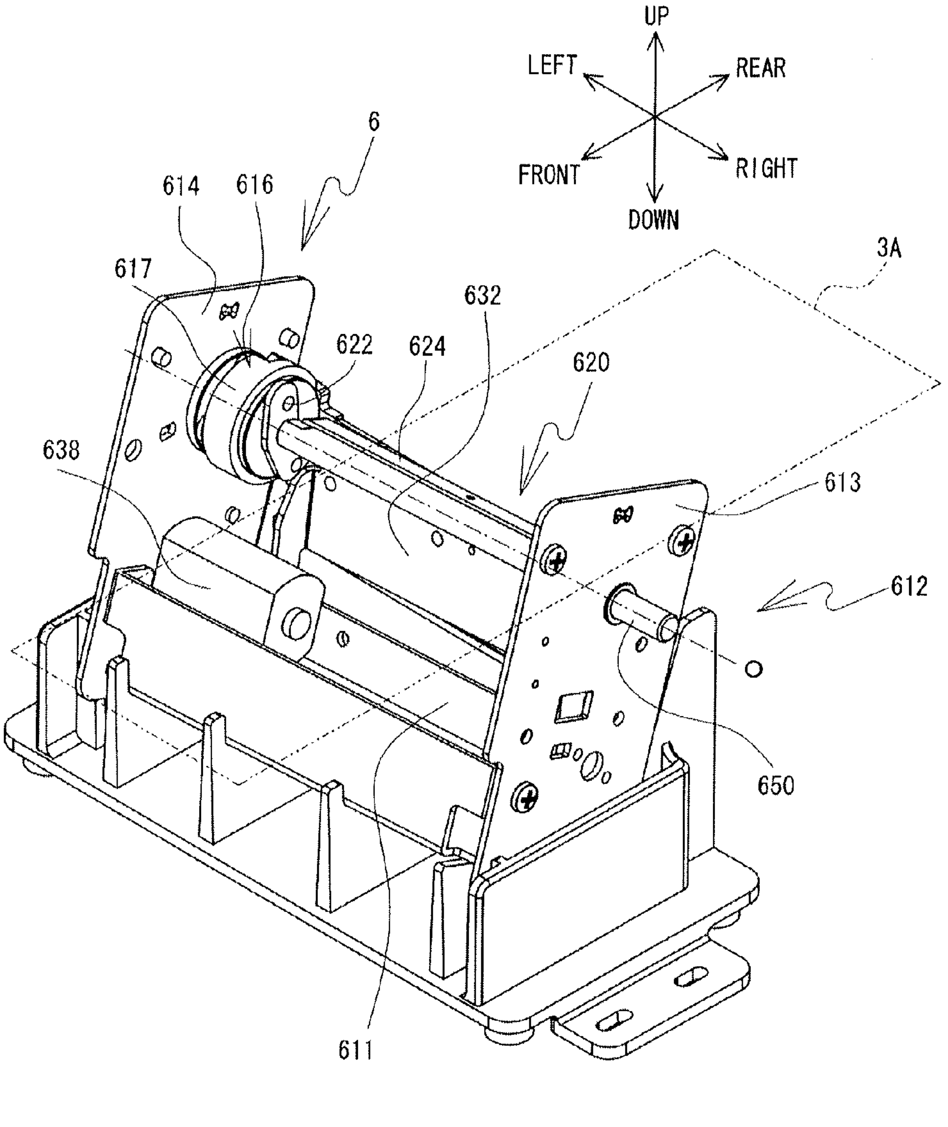
FIG. 5 is a perspective view of the rotary cutter mechanism shown in FIG. 1.

Transmission of the driving force that causes the rotary blade 621 to rotate will be explained. As shown in FIG. 5, a motor 638 is provided close to the second wall portion 614, on the lower side of the housing 612. The motor 638 functions as a driving device of the rotating body 620. As shown in FIG. 7, a drive transmission mechanism 639 is provided on the left face of the second wall portion 614. The drive transmission mechanism 639 may be formed by a gear train that allows an operative connection between a drive shaft 651 and the rotary shaft 650. The drive shaft 651 is a drive shaft of the motor 638 and penetrates the second wall portion 614. The rotary shaft 650 is a rotary shaft of the rotating body 620 and penetrates the second wall portion 614. The motor 638 may cause the rotating body 620 to rotate, via the drive transmission mechanism 639, in a direction in which the first cutting edge portion 621A of the rotary blade 621 approaches the second cutting edge portion 631A of the counter blade 631, from above. Thus, the label tape 3A may be inserted between the rotating body 620 and the holding body 630 may be cut in a state of being continuously fed, without stopping the transportation.

Figure 11:
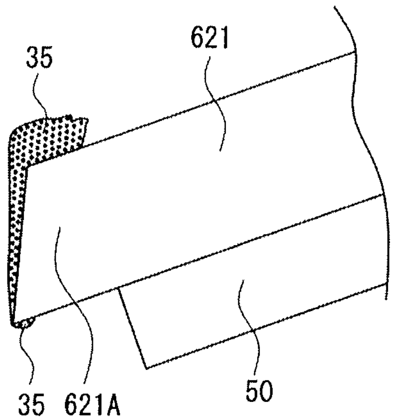
FIG. 11 is a side view showing a state in which adhesive is deposited on a first cutting edge portion of the rotary blade.

In a case where the label tape 3A is cut by the rotary cutter mechanism 6, the adhesive 35 of the adhesive layer 302 of the label tape 3A adheres to the leading edge of the first cutting edge portion 621A. In a case where the cutting of the label tape 3A is continued, the adhesive 35 may be deposited on the leading edge of the first cutting edge portion 621A, as shown in FIG. 11. For that reason, the cut label tape 3A may be likely to adhere to the adhesive 35 deposited on the first cutting edge portion 621A. However, in the present embodiment, the protruding members 50 are provided on the rotary blade 621. Thus, the cut label tape 3A may be unlikely to adhere to the adhesive 35 deposited on the leading edge of the first cutting edge portion 621A. Hereinafter, an explanation will be made of a mode in which the label tape 3A may be cut such that the label tape 3A does not adhere to the first cutting edge portion 621A.

As shown in FIG. 12 A, in a case where the label tape 3A is cut, the protruding members 50 may push the label tape 3A in the rotation direction of the rotary blade 621 immediately before the first cutting edge portion 621A and the second cutting edge portion 631A cut the label tape 3A. As a result of this, the label tape 3A to be obliquely bent to the rotation direction side of the rotary blade 621. Thus, as shown in FIG. 12 B, immediately after the first cutting edge portion 621A and the second cutting edge portion 631A cut the label tape 3A, the cut label tape 3A may be arranged obliquely with respect to the first cutting edge portion 621A. Therefore, a contact area in which the label tape 3A may be in contact with the adhesive 35 (refer to FIG. 11) deposited on the first cutting edge portion 621A may decrease. In a case where the label tape 3A is completely cut, since the contact area between the adhesive 35 and the label tape 3A is small, the cut label tape 3A can be easily separated from the first cutting edge portion 621A due to the centrifugal force of the rotary blade 621, the rigidity of the label tape 3A and the like, as shown in FIG. 12 C. In this manner, in the present embodiment, it is possible to inhibit the label tape 3A from adhering to the first cutting edge portion 621A.

Figure 13:
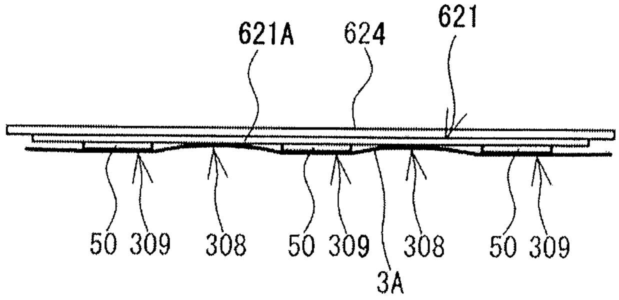
FIG. 13 is a view showing a state of the label tape immediately after it is cut, when the rotary blade is viewed from the first cutting edge portion side.

In the present embodiment, the plurality of protruding members 50 that are separated from each other are provided on the rotary blade 621. In this case, gaps exist between the plurality of protruding members 50. In this case, in a case where the label tape 3A is cut, sections 308 that are recessed portions may be formed in positions corresponding to the gaps between the plurality of protruding members 50, as shown in FIG. 13. Further, sections 309 that are protruding portions may be formed in positions corresponding to the protruding members 50. Since the sections 308 and the sections 309 are formed, the label tape 3A may be slightly deflected. In a case where this deflection occurs, a force acts on the label tape 3A to cancel out the deflection due to the rigidity of the label tape 3A. In response to this, the label tape 3A may slightly move, or a force acts in a direction to separate the label tape 3A from the adhesive 35. As a result of this, the label tape 3A may be more easily separated from the first cutting edge portion 621A. Thus, it is even more difficult for the label tape 3A to adhere to the rotary blade 621.

The label generation device main body 1 and the rotary cutter mechanism 6 of the present embodiment are structured as described above. In the present embodiment, it is possible to inhibit the label tape 3A from adhering to the first cutting edge portion 621A of the rotary blade 621. Therefore, for example, in a case where the cut label tape 3A adheres to the rotary blade 621 and rotates together with the rotary blade 621 and then the next time the label tape 3A is cut, it is possible to inhibit the label tape 3A from being caught between the first cutting edge portion 621A and the second cutting edge portion 631A.

The protruding members 50 may inhibit the label tape 3A from adhering to the rotary blade 621 are provided on the rotary blade 621. Therefore, it is not necessary to provide a member that may inhibit the label tape 3A from adhering to the rotary blade 621, in a position separated from the rotary blade 621. The member that may inhibit the label tape 3A from adhering to the rotary blade 621 is, for example, a roller to pull the label tape 3A. Therefore, it is possible to compactly form the rotary cutter mechanism 6. As a result, it is possible to form the label generation device 500 provided with the rotary cutter mechanism 6 in a small size.

As described above, the direction in which the first cutting edge portion 621A extends (the left-right direction) is inclined with respect to the direction in which the second cutting edge portion 631A extends (the direction in which it extends slightly to the upper left). In this case, the first cutting edge portion 621A intersects with the second cutting edge portion 631A sequentially from the one end (the left end) toward the other end (the right end) of the first cutting edge portion 621A. Therefore, the label tape 3A can be cut sequentially from the section located on the one end side of the first cutting edge portion 621A toward the section located on the other end side. Therefore, it is possible to reduce resistance from the label tape 3A in a case where it is cut, as compared to a case in which the label tape 3A is cut at a single time across the direction in which the first cutting edge portion 621A extends. Thus, the label tape 3A is reliably cut. In other words, since the first cutting edge portion 621A and the second cutting edge portion 631A may cut the label tape 3A while forming a shear angle, the cutting is performed smoothly using a relatively small shearing force. In this manner, the rotary cutter mechanism 6 can further inhibit the label tape 3 from adhering to the rotary blade 621 while the rotary cutter mechanism 6 reliably cuts the label tape 3A.

Figure 12A:
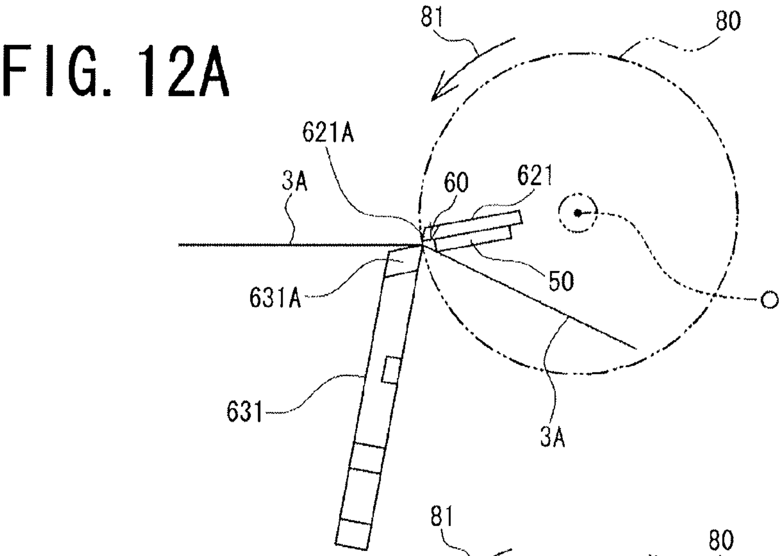
FIGS. 12A-12C are a diagram showing a manner in which the rotary blade rotates and cuts a label tape.
Figure 12B:
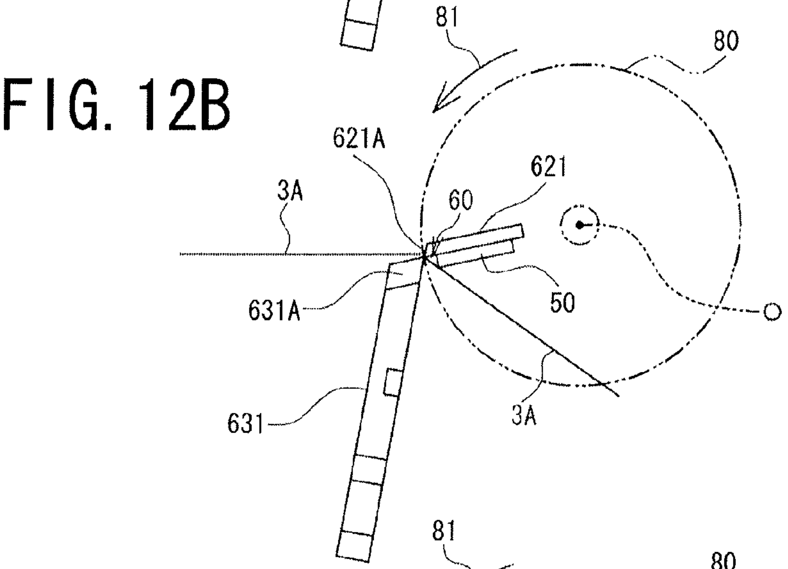
Figure 12C:
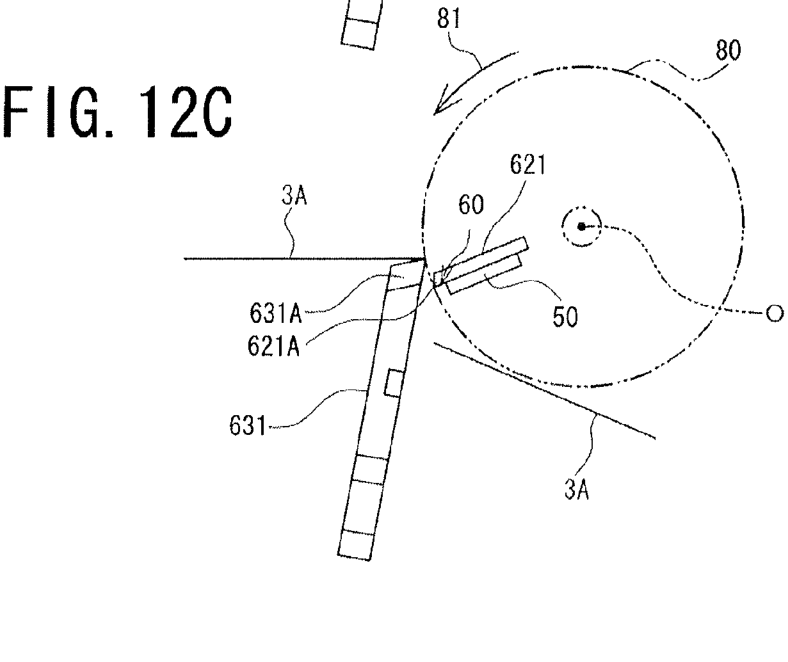

The protruding members 50 are provided closer to the shaft center O side (the lower side in FIG. 10) than the leading edge of the first cutting edge portion 621A on the first direction side. In this case, a clearance 60 in the radial direction of the rotary blade exists between the edge of the first cutting edge portion 621A on the first direction side and each of the protruding members 50 (refer to FIG. 12A to FIG. 12C). In a case where the clearance 60 does not exist, when the label tape 3A is cut, the protruding member 50 approaches the second cutting edge portion 631A of the counter blade 631. In this case, the label tape 3A pressed by the protruding member 50 may be bent between the second cutting edge portion 631A of the counter blade 631 and the protruding member 50. As a result, the label tape 3A is parallel to a tangent line (the vertical direction in FIG. 12B) in the rotation direction of the rotary blade 621. More specifically, the label tape 3A is oriented in the same direction as the rotation direction of the rotary blade 621. Therefore, it is difficult for the rotary blade 621 to cut the label tape 3A. On the other hand, in a case where the clearance 60 is provided, the label tape 3A pressed by the protruding member 50 may be bent at the second cutting edge portion 631A of the counter blade 631, and obliquely extends toward an edge portion of the protruding member 50 on the rotation direction side, as shown in FIG. 12 A and FIG. 12 B. In this case, since the direction in which the label tape 3A extends intersects with the direction in which the rotary blade 621 rotates, the label tape 3A is reliably cut.

Figure 14:
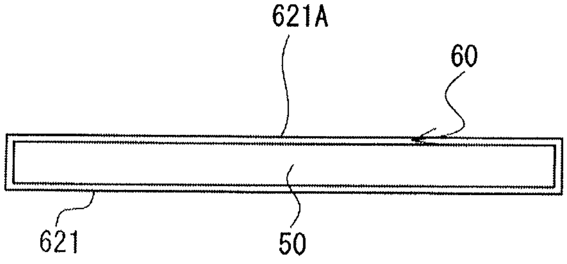
FIG. 14 is a view of the rotary blade, on which a protruding member is provided at a position different from that on the rotary blade shown in FIG. 10, as viewed from the rotation direction side.

The present disclosure is not limited to the above-described embodiment, and various modifications are possible. For example, although the plurality of the protruding members 50 are provided, the present disclosure is not limited to this example. For example, as shown in FIG. 14, the protruding member 50 may be a single sheet that extends along the direction in which the first cutting edge portion 621A extends. Also in this case, similarly to the above-described embodiment, the contact area between the cut label tape 3A and the first cutting edge portion 621A decreases. Therefore, it is possible to inhibit the cut label tape 3A from adhering to the rotary blade 621 while the rotary cutter mechanism 6 and the label generation device 500 are formed to be compact.

Figure 15:
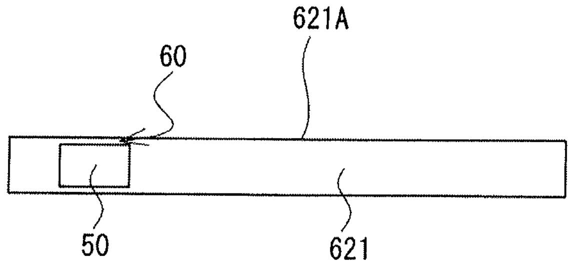
FIG. 15 is a view of the rotary blade, on which the protruding member is provided at a position different from that on the rotary blade shown in FIG. 10, as viewed from the rotation direction side.

As shown in FIG. 15, the protruding member 50 may be provided in a section on the right end side (the left side in FIG. 15) in the edge portion of the rotary blade 621 on the first direction side. The section on the right end side of the first cutting edge portion 621A is a section that cuts the label tape 3A last. In a case where the protruding member 50 is provided on this section, this results in a decrease in the contact area in which the right end portion of the label tape 3A that is cut last is in contact with the adhesive deposited on the first cutting edge portion 621A. In this case, due to the centrifugal force of the rotary blade 621, the rigidity of the label tape 3A and the like, the right end portion of the label tape 3A that is cut last is separated from the first cutting edge portion 621A. Then, starting from the separated right end portion, the whole of the cut label tape 3A is separated from the first cutting edge portion 621A. Therefore, it is possible to inhibit the label tape 3A from adhering to the first cutting edge portion 621A of the rotary blade 621 while decreasing the area in which the protruding member 50 is provided.

Figure 16:
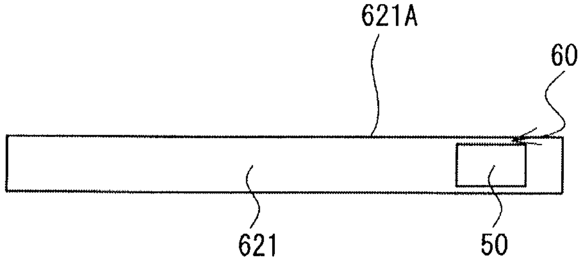
FIG. 16 is a view of the rotary blade, on which the protruding member is provided at a position different from that on the rotary blade shown in FIG. 10, as viewed from the rotation direction side.

As shown in FIG. 16, the protruding member 50 may be provided in a section on the left end side (the right side in FIG. 16) in the edge portion of the rotary blade 621 on the first direction side. The section on the left end side of the first cutting edge portion 621A is a section that cuts the label tape 3A first. In a case where the protruding member 50 is provided on this section, this results in a decrease in the contact area in which the left end portion of the label tape 3A that is cut first is in contact with the adhesive deposited on the first cutting edge portion 621A. In this case, due to the centrifugal force of the rotary blade 621, the rigidity of the label tape 3A and the like, the left end portion of the label tape 3A that is cut first is separated from the first cutting edge portion 621A. Then, starting from the separated left end portion, the whole of the cut label tape 3A is separated from the first cutting edge portion 621A. Therefore, it is possible to inhibit the label tape 3A from adhering to the first cutting edge portion 621A of the rotary blade 621 while decreasing the area in which the protruding member 50 is provided.

The protruding member 50 is a sheet having a thickness. However, the shape and the material etc. of the protruding member 50 are not limited to those of the present embodiment. For example, the protruding member 50 may be a plate-shaped metal member. The protruding member 50 may be a rod-like member that is long in the left-right direction and that is provided on the edge portion of the rotary blade 621 on the first direction side. The protruding member 50 may be a columnar member that protrudes toward the rotation direction side.

In the above-described embodiment, as shown in FIG. 2, the rotating body 620 and the holding body 630 are disposed such that, when viewed from the front side, the feed path of the label tape 3A (in other words, the second cutting edge portion 631A) is horizontal and the shaft center O of the rotating body 620 is inclined with respect to the horizontal direction. However, the present disclosure is not limited to this example. For example, the rotating body 620 and the holding body 630 may be disposed such that, when viewed from the front side, the shaft center O of the rotating body 620 is horizontal and the feed path of the label tape 3A (the second cutting edge portion 631A) is inclined with respect to the horizontal direction.

In the above-described embodiment, the rotary cutter mechanism 6 is provided outside the label generation device main body 1. However, the present disclosure is not limited to this example. For example, the rotary cutter mechanism 6 may be built into the label generation device main body 1. Also in this case, similarly to the above-described embodiment, there is no need to provide a member (for example, a roller to pull the label tape 3A) that may inhibit the label tape 3A from adhering to the rotary blade 621, in a position separated from the rotary blade 621. Thus, it is possible to form the label generation device main body 1 more compactly.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A rotary cutter mechanism comprising:

a shaft;

a rotary blade which is rotatably provided around a center of the shaft and which extends from a first cutting edge portion toward the shaft center, the first cutting edge portion having a width, extending in an axial line direction of the shaft center, at an edge portion on a first direction side, the first direction being a direction away from the shaft center;

a counter blade which is provided to face a locus drawn by the first cutting edge portion of the rotating rotary blade and which includes a second cutting edge portion, the second cutting edge portion having a width in the axial line direction, and the counter blade being configured to cut an object to be cut between the first cutting edge portion of the rotating rotary blade and the second cutting edge portion of the counter blade; and a plurality of spaced apart protruding sheet members separated by gaps arranged along the axial direction of the shaft each having a first face and a second face, the first face of a leading edge of the protruding sheet member on the first direction side being closely attached to a surface of the rotary blade facing a rotation direction of the rotary blade, the rotary blade having an exposed surface in the gaps between the protruding sheet members;

the second face facing the rotation direction, the protruding sheet members being provided on the edge portion of the rotary blade closer to the shaft center than a leading edge of the first cutting edge portion on the first direction side and which protrudes from the rotary blade toward the rotation direction side, the rotation direction side being a side on which the rotary blade faces the object to be cut in a case where the object to be cut is cut between the first cutting edge portion and the second cutting edge portion, the leading edge of the first cutting edge portion extending further from the shaft center in the first direction than the leading edge of the protruding sheet members whereby the protruding sheet members push the object to be cut in the rotation direction side and bend the object to be cut obliquely to the rotation direction side before cutting the object to be cut by the first cutting edge portion and the second cutting edge portion wherein the leading edges of the protruding sheet members are separated from the second cutting edge portion of the counter blade, and the leading edge of the first cutting edge portion on the first direction side and the leading edge of the protruding sheet member defining a clearance in radial direction of the rotary blade, and the leading edge of the protruding sheet members are parallel with the leading edge of the first cutting edge portion.

2. The rotary cutter mechanism according to claim 1, wherein the protruding sheet member is provided in a plurality, on the edge portion of the rotary blade on the first direction side, along a direction in which the first cutting edge portion extends, the plurality of protruding sheet members being separated from each other.

3. The rotary cutter mechanism according to claim 1, wherein a direction in which the first cutting edge portion extends is inclined with respect to a direction in which the second cutting edge portion extends, and when the rotary blade rotates and cuts the object to be cut, the first cutting edge portion intersects with the second cutting edge portion sequentially from one end toward an opposite end of the first cutting edge portion.

4. The rotary cutter mechanism according to claim 3, wherein the protruding sheet member is provided in a section on the other end side in the edge portion of the rotary blade on the first direction side.

5. The rotary cutter mechanism according to claim 3, wherein the protruding sheet member is provided in a section on the one end side in the edge portion of the rotary blade on the first direction side.

6. The rotary cutter mechanism according to claim 1, wherein the protruding sheet member is provided closer to the shaft center than the leading edge of the first cutting edge portion on the first direction side.

* * * * *